L. L. UPSHAW.
PICKING MECHANISM FOR COTTON HARVESTERS.
APPLICATION FILED AUG. 26, 1912.
1,084,508.
Patented Jan. 13, 1914.
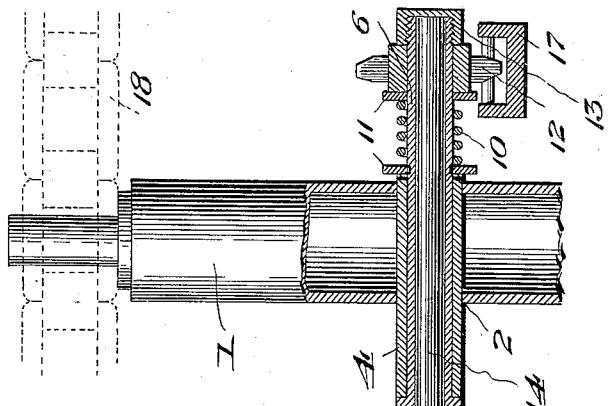
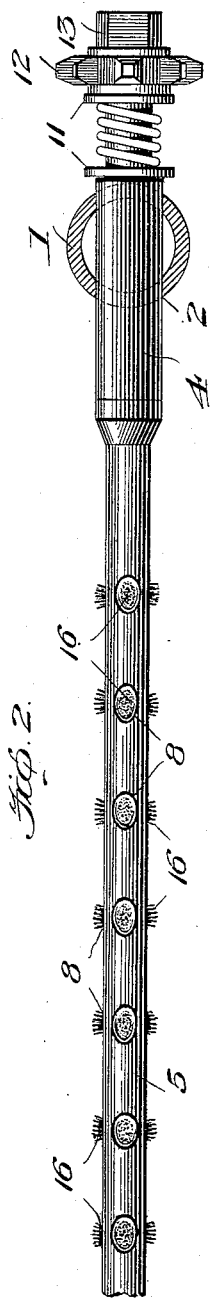
WITNESSES
INVENTOR
Lucius L. Upshaw.
By T. Walter Fowler Attorney

UNITED STATES PATENT OFFICE.

LUCIUS L. UPSHAW, OF DENISON, TEXAS, ASSIGNOR OF ONE-FIFTH TO GODWIN L. BLACKFORD AND ONE-FIFTH TO PATRIC H. TOBIN, OF DENISON, TEXAS.

PICKING MECHANISM FOR COTTON-HARVESTERS.

1,084,508.     Specification of Letters Patent.    Patented Jan. 13, 1914.

Application filed August 26, 1912. Serial No. 717,029.

*To all whom it may concern:*

Be it known that I, LUCIUS L. UPSHAW, a citizen of the United States, residing at Denison, in the county of Grayson and State of Texas, have invented certain new and useful Improvements in Picking Mechanism for Cotton-Harvesters, of which the following is a specification.

This invention relates to certain new and useful improvements in the picking mechanism of a machine designed particularly for harvesting the cotton crop, and a leading object of the invention is to so construct the picker-spindles of such machines that in the event of the spindle meeting with an unusual resistance or an obstruction of sufficient power to impair the successful operation of the spindle, or which has a tendency to damage the spindle, that said spindle will yield relatively to its carrier, but will immediately resume its rotation as soon as the obstruction has been passed, or the resistance reduced to a certain point.

With the above and other objects in view my invention consists of the parts and the constructions, arrangements and combinations of parts which I will hereinafter describe and claim.

In the accompanying drawings forming part of this specification, and in which similar reference characters indicate like parts in the several views, Figure 1 is a side elevation of a picker-spindle and part of a support or carrier therefor. Fig. 2 is a part horizontal sectional view and a part plan view of Fig. 1.

In my prior Patent No. 1,041,202, dated October 15, 1912, I have disclosed a cotton harvesting machine embodying rotatable picker-spindles carried by vertical rods or supports which in turn are pivotally secured between upper and lower sprocket-chains of an endless-carrier mechanism; in another application filed of even date herewith Serial Number 717,028 I have disclosed a similar type of machine, except that in this latter case the machine is designed to operate upon two rows of cotton at the same time, said second application showing and describing, but not claiming, a picker-mechanism of the type shown in the present application.

As the present application has relation only to the picker-spindle mechanism, I have omitted therefrom the particular carriers and the means for operating the same, and particularly because the picker-mechanism hereinafter described and claimed will be found useful in other types of cotton harvesters, and in fact wherever a rotatable picker-spindle is employed for the purpose of harvesting the cotton crop.

The machines of the character described are usually supplied with one or more series of picking mechanism and each mechanism includes a vertically disposed rod, or bar, 1, the opposite ends of which may be pivotally connected to sprocket chains, 18, as in my aforesaid applications, said rods being pierced at different points in their length to receive the horizontally disposed picker-spindles, 5. The rods form carriers for the picker-spindles and the spindles are arranged thereon in a vertical row and as many rods and rows of picket-spindles may be employed in the machine as may be found advisable or necessary.

Each picker-spindle is of substantially tubular form and may be closed at the outer end, 9, and said end pointed to facilitate the stripping of the cotton which has been gathered by the picker-spindles, the tubular spindle being perforated throughout its length, with the perforations, 8, extending radially and adapted to permit the projection therethrough of the bristles or fiber of a suitable brush material, 16, which material may be interwoven or otherwise carried by a twisted wire or other holder, 15, which is passed into the tube so that the bristles or fiber will project through the perforations a sufficient distance to cause them to engage the cotton when revolved in contact therewith, and thus remove the cotton from the open boll.

By using twisted wire with fiber fixed to the coils thereof, it is quite evident that by rotation of the twisted wire in the tubular spindle, the brush fiber may be projected or withdrawn, thus adjusting the length of the fiber which is exposed on the outside of the picker-spindle. There is a distinct advantage in countersinking the outer ends of the holes in the perforations, 8, as these countersunk portions provide concavities into which the outer ends of the brush fiber may be bent in any and all directions without material injury to the fiber when stripping the spindles of an accumulated mass of picked cotton, as fully disclosed in my aforesaid applications. As the present improvements may, however, be used in connection with other forms of picker-spindles, I wish it understood that the present improvements are not limited to the particular form of spindle before described, but that they may be used in connection with other forms of spindle and in fact with any spindle which is constructed to rotate in contact with open bolls of cotton for the purpose of removing the cotton therefrom.

I prefer that the picker-spindle shall extend through an appropriate bushing or sleeve, 4, fixed in the vertical rod or bar, 1, which serves as a carrier for the spindle, 5, said spindle projecting beyond the opposite side of said bar and having at its inner end a pinion or toothed wheel, 12, adapted to operate in connection with a suitable rack, 17, which may correspond to the rack shown and described in the companion application filed of even date herewith. By this or equivalent means the spindle is rotated in contact with the open bolls and thus removes the cotton therefrom. Any mechanism for imparting rotation to the picker-spindles is regarded as within the scope of the present invention, when associated with the features of improvement which I will hereinafter more particularly define.

As the picker-spindles often become entangled in the branches of a growing plant to such an extent that the branch is often broken and excessive strains are thrown upon the spindle, and twigs and litter due to torn leaves are often carried with the cotton to the point of deposit, I prefer in the present improvement that the picker-spindle shall be constructed so that it will yield under a predetermined pressure or strain. To this end the pinion, 12, is loose upon the journal end of the spindle, and on the inner end of the spindle, between the pinion and the vertical rod, or bar, which carries it, is a spring, 10, the tension of which may be adjusted at all times by a suitable nut, 13, on the inner threaded end of the picker-spindle. Suitable washers, 11, are used between the nut and pinion and at each end of the spring, and by turning the nut and thereby adjusting the tension of the spring, the pinion will be held firmly to the picker-spindle under normal conditions, but when the picker-spindle meets an obstruction or a resistance which is in excess of that of the tension of the spring, 10, the latter will yield to permit the pinion to turn relatively to the spindle, as said pinion is traveling over the rack, until the obstruction is passed or the resistance is reduced below the tension of the spring, when the parts return to normal position, and the "dead" spindle may be again rotated by and in unison with the pinion. I thus provide a mechanism which is automatic in its operation and which will relieve the picker-spindles of excessive strains and will accordingly prolong the life of these important parts.

If desired, a solid pin or plug, 14, may be driven into the inner end of the hollow picker-spindle to thereby give increased rigidity and strength to that portion of the spindle which passes through the vertical bar or rod which serves as a carrier for the spindle.

Having thus described my invention what I claim as new and desire to secure by Letters Patent is:—

1. In a cotton harvester, a picker spindle and a carrier therefor arranged at right angles to the spindle, said spindle being hollow and perforated and adapted to contain a brush material, the ends of which project through the perforations of the spindle; a toothed wheel slidably mounted on the inner end of the spindle, said spindle having an abutment spaced from the wheel; a spring interposed between one face of the wheel and said abutment, and through which spring, carrier and wheel the inner end of the spindle passes; a nut on the spindle bearing against the other side of said wheel and adjusting the tension of the spring; and a strengthening rod in the inner end of the spindle and reinforcing that part thereof which extends transversely through the carrier.

2. A horizontal picker spindle and a carrier therefor arranged at right angles to the spindle, said carrier being perforated to admit the inner end of the spindle; a bushing fixed in the perforation of the carrier and adapted to receive the inner end of the spindle, said inner end of the spindle having an abutment fixed to it adjacent a vertical side of the carrier; a toothed wheel loose on the inner end of the spindle; a spring interposed between the said wheel and the abutment and surrounding the spindle, said spring operating expansively to hold the wheel toward the inner end of the spindle; and a nut on the inner end of the spindle against which the wheel bears, said nut adapted to slide the wheel relatively to the spindle, to increase or decrease the tension of said spring.

In testimony whereof I affix my signature in presence of two witnesses.

LUCIUS L. UPSHAW.

Witnesses:
T. WALTER FOWLER,
C. W. FOWLER.

---

Copies of this patent may be obtained for five cents each, by addressing the "Commissioner of Patents, Washington, D. C."